(12) United States Patent
Tseng et al.

(10) Patent No.: US 12,100,554 B2
(45) Date of Patent: Sep. 24, 2024

(54) CERAMIC COMPOSITION, CERAMIC SINTERED BODY, CAPACITOR AND METHOD FOR MANUFACTURING THE SAME

(71) Applicant: WALSIN TECHNOLOGY CORPORATION, Taipei (TW)

(72) Inventors: Chun-Ju Tseng, Kaohsiung (TW); Li-Wen Chu, Taipei (TW)

(73) Assignee: WALSIN TECHNOLOGY CORPORATION, Taipei (TW)

( * ) Notice: Subject to any disclaimer, the term of this patent is extended or adjusted under 35 U.S.C. 154(b) by 245 days.

(21) Appl. No.: 17/847,711

(22) Filed: Jun. 23, 2022

(65) Prior Publication Data
US 2023/0420187 A1 Dec. 28, 2023

(51) Int. Cl.
*H01G 4/00* (2006.01)
*C04B 35/468* (2006.01)
*C04B 35/48* (2006.01)
*C04B 35/628* (2006.01)
*H01G 4/008* (2006.01)
(Continued)

(52) U.S. Cl.
CPC ......... *H01G 4/1227* (2013.01); *C04B 35/468* (2013.01); *C04B 35/48* (2013.01); *C04B 35/62807* (2013.01); *C04B 35/6281* (2013.01); *C04B 35/62815* (2013.01);
(Continued)

(58) Field of Classification Search
CPC ...... H01G 4/1227; H01G 4/008; H01G 4/012; H01G 4/03; C04B 35/468; C04B 35/48; C04B 35/62807; C04B 35/6281; C04B 35/62815
See application file for complete search history.

(56) References Cited

U.S. PATENT DOCUMENTS

| 4,988,468 A | 1/1991 | Nishioka |
| 2016/0090325 A1 | 3/2016 | Yoon |

FOREIGN PATENT DOCUMENTS

| CN | 1282079 A | 1/2001 |
| CN | 101088960 A | 12/2007 |

(Continued)

OTHER PUBLICATIONS

KR 20220062656 A; English Translation (Year: 2022).*
(Continued)

*Primary Examiner* — Pete T Lee
(74) *Attorney, Agent, or Firm* — WPAT, PC

(57) ABSTRACT

The present invention provides a ceramic composition, comprising a primary mixture and a secondary mixture, wherein the primary mixture comprises a first primary ingredient powder and a second primary ingredient powder, and the first primary ingredient powder comprises $BaTiO_3$, the second primary ingredient powder comprises any of $SrTiO_3$, $Ba_{0.95}Ca_{0.05}TiO_3$, $BaZr_{0.1}Ti_{0.9}O_3$ or a combination thereof, and the secondary mixture comprises a rare earth oxide, a silicon oxide and an alkaline-earth metal oxide. The present invention further provides a ceramic sintered body obtained by sintering the ceramic composition, and a capacitor comprising the ceramic sintered body and a method for manufacturing the same; wherein the capacitor satisfies EIA-X8R specification, and has a high dielectric constant.

19 Claims, 3 Drawing Sheets

(51) Int. Cl.
      *H01G 4/012*       (2006.01)
      *H01G 4/12*        (2006.01)
      *H01G 4/30*        (2006.01)

(52) U.S. Cl.
      CPC ............. *H01G 4/008* (2013.01); *H01G 4/012* (2013.01); *H01G 4/30* (2013.01)

(56) References Cited

FOREIGN PATENT DOCUMENTS

| | | | |
|---|---|---|---|
| CN | 101765894 | A | 6/2010 |
| CN | 103214236 | A | 7/2013 |
| CN | 107039177 | A | 8/2017 |
| JP | 2011009369 | A | 1/2011 |
| TW | 200814111 | A | 3/2008 |
| TW | 200905704 | A | 2/2009 |
| TW | 201728556 | A | 8/2017 |
| TW | 202042405 | A | 11/2020 |

OTHER PUBLICATIONS

Norhizatol Fashren Muhamad et al., Physical and electrical properties of SrTiO3 and SrZrO3, the European Physical Journal Web of Conferences, InCAPE2017, vol. 162, No. 01052, Nov. 2017.

\* cited by examiner

US 12,100,554 B2

CERAMIC COMPOSITION, CERAMIC SINTERED BODY, CAPACITOR AND METHOD FOR MANUFACTURING THE SAME

BACKGROUND OF THE INVENTION

1. Field of the Invention

The present invention relates to a ceramic composition, especially the ceramic composition used for a capacitor. The present invention further relates to a capacitor containing a ceramic sintered body prepared by the ceramic composition and a method for manufacturing the capacitor, especially multilayer ceramic capacitors and the manufacturing method thereof.

2. Description of the Prior Arts

The multilayer ceramic capacitor (MLCC) has the advantages such as high reliability and low production cost, and the recent market demands focus on high capacitance, and tolerance of high operating temperature, high voltage and high frequency. Further, due to the advancement of the electronization of traditional fuel vehicles, new energy vehicles, autonomous vehicles and the internet of vehicles, the MLCC satisfying the traditional specification of X7R (−55° C. to 125° C. and $\Delta C/C \leq \pm 15\%$) no longer fulfills such emerging market demands. As every car will be equipped with more electronic elements with MLCC in the future, the MLCC for cars has a great market potential. Therefore, in order to achieve an electronic system that can operate in an extreme environment of high temperature, the MLCC with the advantages of high reliability, high dielectric constant and tolerance of high voltage, which satisfies the specification of X8R (−55° C. to 150° C. and $\Delta C/C \leq \pm 15\%$), is proposed.

In order to meet the specification of X8R for MLCC, the traditional method replaces barium (Ba) in barium titanate ($BaTiO_3$) with bismuth (Bi) and lead (Pb), which results in the shift of Curie temperature to a higher temperature, to achieve the goal. However, the dielectric layer comprising the dielectric materials of bismuth and lead will be reduced into a conductor after sintering at reduced atmosphere, which causes the decrease of the insulation resistance of the MLCC. Therefore, the dielectric layer with the electrodes made of precious metals such as palladium (Pd) and silver (Ag) is required for co-sintering in order to prevent the reduction of the dielectric layer, thereby resulting in high production cost. In other words, there is a need to further develop a MLCC manufacturing technology that satisfies the EIA-X8R specification without the adoption of precious metals.

SUMMARY OF THE INVENTION

To solve the aforementioned problems, the present invention provides a ceramic composition, comprising a primary mixture and a secondary mixture, wherein the primary mixture comprises a first primary ingredient powder and a second primary ingredient powder, and the first primary ingredient powder comprises $BaTiO_3$, the second primary ingredient powder comprises any of $SrTiO_3$, $CaTiO_3$, $BaZrO_3$, $SrZrO_3$, $Ba_xCa_{(1-x)}TiO_3$, $Ca_xSr_{(1-x)}ZrO_3$, $BaZr_yTi_{(1-y)}O_3$, $Ca_xSr_{(1-x)}ZryTi_{(1-y)}O_3$ or a combination thereof, wherein x is from 0.91 to 0.99, and y is from 0.05 to 0.2; and the secondary mixture comprises a rare earth oxide, a silicon oxide and an alkaline-earth metal oxide.

Preferably, x is 0.92, 0.93, 0.94, 0.95, 0.96, 0.97, 0.98 or 0.99.

Preferably, y is 0.05, 0.07, 0.09, 0.1, 0.11, 0.13, 0.15, 0.17 or 0.2.

More preferably, the second primary ingredient powder comprises any of $SrTiO_3$, $Ba_{0.95}Ca_{0.05}TiO_3$, $BaZr_{0.1}Ti_{0.9}O_3$ or a combination thereof.

The ceramic composition of the present invention could be adopted as a raw material to prepare a multilayer ceramic capacitor (MLCC) that satisfies EIA-X8R specification, even when the MLCC adopts electrodes made of a base metal. Further, as bismuth and lead are not required for the ceramic composition of the present invention, the dielectric layer formed by the ceramic composition of the present invention will not be reduced into a conductor. Therefore, gold, silver, palladium and other precious metals will no longer be required for preparing the internal and external electrodes to prevent the decrease of the insulation resistance of the MLCC, thereby reducing the production cost.

In one embodiment, based on the total amount of the primary mixture, the first primary ingredient powder is in an amount of 55 weight percent to 95 weight percent, and the second primary ingredient powder is in an amount of 5 weight percent to 45 weight percent.

Preferably, the second primary ingredient powder is $SrTiO_3$. Based on the total amount of the primary mixture, the first primary ingredient powder is in an amount of 88 weight percent to 92 weight percent, and the second primary ingredient powder is in an amount of 8 weight percent to 12 weight percent.

Preferably, the second primary ingredient powder is $Ba_{0.95}Ca_{0.05}TiO_3$. Based on the total amount of the primary mixture, the first primary ingredient powder is in an amount of 55 weight percent to 75 weight percent, and the second primary ingredient powder is in an amount of 25 weight percent to 45 weight percent.

In one embodiment, the rare earth oxide comprises any of europium (Eu) oxide, gadolinium (Gd) oxide, yttrium (Y) oxide, terbium (Tb) oxide, dysprosium (Dy) oxide, holmium (Ho) oxide, erbium (Er) oxide, thulium (Tm) oxide and ytterbium (Yb) oxide or a combination thereof, but is not limited thereto. Preferably, the rare earth oxide comprises any of $Y_2O_3$, $Yb_2O_3$, $Dy_2O_3$ or a combination thereof.

According to the present invention, the addition of a rare earth oxide facilitates smoothing the temperature coefficient of capacitance curve and improves the dissipation factor of a capacitor.

In one embodiment, the silicon oxide comprises silica, silicate glass or silica gel, but is not limited thereto. Preferably, the silicon oxide comprises $SiO_2$.

In one embodiment, the alkaline-earth metal oxide comprises any of MgO, CaO, SrO, BaO or a combination thereof, but is not limited thereto.

The present invention adopts a silicon oxide and an alkaline-earth metal oxide to adjust the properties of a ceramic sintered body after sintering.

In one embodiment, based on the primary mixture in an amount of 100 molar percent, the secondary mixture is in an amount of 1.1 molar percent to 13.5 molar percent. In other words, when the primary mixture is in an amount of 100 moles, the secondary mixture is in an amount of 1.1 moles to 13.5 moles.

Preferably, the second primary ingredient powder is $SrTiO_3$. Based on the primary mixture in an amount of 100 molar percent, the secondary mixture is in an amount of 5 molar percent to 6 molar percent.

Preferably, the second primary ingredient powder is $Ba_{0.95}Ca_{0.05}TiO_3$. Based on the primary mixture in an amount of 100 molar percent, the secondary mixture is in an amount of 3 molar percent to 8.8 molar percent.

In one embodiment, based on the primary mixture in an amount of 100 molar percent, the rare earth oxide, the silicon oxide and the alkaline-earth metal oxide are in an amount of 0.3 molar percent to 8 molar percent: 0.01 molar percent to 1.5 molar percent: 0.1 molar percent to 5.5 molar percent. In other words, when the primary mixture is in an amount of 100 moles, the rare earth oxide is in an amount of 0.3 moles to 8 moles, the silicon oxide is in an amount of 0.01 moles to 1.5 moles, and the alkaline-earth metal oxide is in an amount of 0.1 moles to 5.5 moles.

Preferably, based on the primary mixture in an amount of 100 molar percent, the rare earth oxide, the silicon oxide and the alkaline-earth metal oxide are in an amount of 0.3 molar percent to 6.5 molar percent: 0.3 molar percent to 1.5 molar percent: 0.5 molar percent to 5.5 molar percent.

Preferably, the second primary ingredient powder is $SrTiO_3$. Based on the primary mixture in an amount of 100 molar percent, the rare earth oxide, the silicon oxide and the alkaline-earth metal oxide are in an amount of 3.7 molar percent to 4.3 molar percent: 0.4 molar percent to 0.6 molar percent: 0.9 molar percent to 1.1 molar percent.

Preferably, the second primary ingredient powder is $Ba_{0.95}Ca_{0.05}TiO_3$. Based on the primary mixture in an amount of 100 molar percent, the rare earth oxide, the silicon oxide and the alkaline-earth metal oxide are in an amount of 1.8 molar percent to 2.2 molar percent: 0.15 molar percent to 1.1 molar percent: 0.8 molar percent to 5.5 molar percent.

Preferably, the primary mixture further comprises a third primary ingredient powder, and the third primary ingredient powder is $CaZrO_3$.

According to the present invention, the addition of $CaZrO_3$ facilitates the improvement of the dissipation factor of a capacitor and the decrease of the capacitance change.

In one embodiment, based on the total amount of the primary mixture, the first primary ingredient powder is in an amount of 45 weight percent to 75 weight percent, the second primary ingredient powder is in an amount of 15 weight percent to 25 weight percent, and the third primary ingredient powder is in an amount of 5 weight percent to 35 weight percent.

Preferably, the second primary ingredient powder is $SrTiO_3$. Based on the total amount of the primary mixture, the first primary ingredient powder is in an amount of 45 weight percent to 75 weight percent, the second primary ingredient powder is in an amount of 15 weight percent to 25 weight percent, and the third primary ingredient powder is in an amount of 5 weight percent to 35 weight percent.

Preferably, the second primary ingredient powder is $Ba_{0.95}Ca_{0.05}TiO_3$. Based on the total amount of the primary mixture, the first primary ingredient powder is in an amount of 45 weight percent to 75 weight percent, the second primary ingredient powder is in an amount of 15 weight percent to 25 weight percent, and the third primary ingredient powder is in an amount of 5 weight percent to 35 weight percent.

Preferably, the second primary ingredient powder is $BaZr_{0.1}Ti_{0.9}O_3$. Based on the total amount of the primary mixture, the first primary ingredient powder is in an amount of 45 weight percent to 75 weight percent, the second primary ingredient powder is in an amount of 15 weight percent to 25 weight percent, and the third primary ingredient powder is in an amount of 5 weight percent to 35 weight percent.

Preferably, the primary mixture further comprises a third primary ingredient powder, and the second primary ingredient powder is $SrTiO_3$. Based on the primary mixture in an amount of 100 molar percent, the secondary mixture is in an amount of 1.6 molar percent to 8.3 molar percent.

Preferably, the primary mixture further comprises a third primary ingredient powder, and the second primary ingredient powder is $Ba_{0.95}Ca_{0.05}TiO_3$. Based on the primary mixture in an amount of 100 molar percent, the secondary mixture is in an amount of 3 molar percent to 4 molar percent.

Preferably, the primary mixture further comprises a third primary ingredient powder, and the second primary ingredient powder is $BaZr_{0.1}Ti_{0.9}O_3$. Based on the primary mixture in an amount of 100 molar percent, the secondary mixture is in an amount of 3.9 molar percent to 5.1 molar percent.

Preferably, the primary mixture further comprises a third primary ingredient powder, and the second primary ingredient powder is $SrTiO_3$. Based on the primary mixture in an amount of 100 molar percent, the rare earth oxide, the silicon oxide and the alkaline-earth metal oxide are in an amount of 0.4 molar percent to 6.5 molar percent: 0.4 molar percent to 0.6 molar percent: 0.8 molar percent to 1.2 molar percent.

Preferably, the primary mixture further comprises a third primary ingredient powder, and the second primary ingredient powder is $Ba_{0.95}Ca_{0.05}TiO_3$. Based on the primary mixture in an amount of 100 molar percent, the rare earth oxide, the silicon oxide and the alkaline-earth metal oxide are in an amount of 1.8 molar percent to 2.2 molar percent: 0.4 molar percent to 0.6 molar percent: 0.8 molar percent to 1.2 molar percent.

Preferably, the primary mixture further comprises a third primary ingredient powder, and the second primary ingredient powder is $BaZr_{0.1}Ti_{0.9}O_3$. Based on the primary mixture in an amount of 100 molar percent, the rare earth oxide, the silicon oxide and the alkaline-earth metal oxide are in an amount of 2.7 molar percent to 3.3 molar percent: 0.4 molar percent to 0.6 molar percent: 0.8 molar percent to 1.2 molar percent.

Preferably, the average diameter of the primary mixture is 150 nanometers to 600 nanometers, such as: 150 nanometers, 200 nanometers, 250 nanometers, 300 nanometers, 350 nanometers, 400 nanometers, 450 nanometers, 500 nanometers, 550 nanometers or 600 nanometers. More preferably, the average diameter of the primary mixture is 250 nanometers to 400 nanometers. In one embodiment of the present invention, the average diameter of the primary mixture indicates the average diameter of the first primary ingredient powder and the second primary ingredient powder. In another embodiment of the present invention, the average diameter of the primary mixture indicates the first primary ingredient powder, the second primary ingredient powder and the third primary ingredient powder.

Preferably, the average particle diameter of the first primary ingredient 3 powder is 150 nanometers to 600 nanometers, such as: 150 nanometers, 200 nanometers, 250 nanometers, 300 nanometers, 350 nanometers, 400 nanometers, 450 nanometers, 500 nanometers, 550 nanometers or 600 nanometers. More preferably, the average particle diameter of the first primary ingredient powder is 250 nanometers to 400 nanometers.

The first primary ingredient powder is prepared by solid state reaction, oxalate coprecipitation or hydrothermal method. The present invention may adopt various manufacturing methods for preparing the first primary ingredient powder to obtain the first primary ingredient powders with different average particle diameters.

The present invention further provides a ceramic sintered body, obtained by sintering the ceramic composition, and comprising multiple granules connecting to each other; wherein the granules each have a core and a shell, and the shell is located at an outer surface of the core; wherein the core comprises a particle of the first primary ingredient powder and/or a particle of the second primary ingredient powder, and the shell comprises the rare earth oxide, the silicon oxide and the alkaline-earth metal oxide.

In one embodiment, each of the cores of the granules comprises the particle of the first primary ingredient powder or the particle of the second primary ingredient powder, respectively. Preferably, each core comprises one particle of the first primary ingredient powder or one particle of the second primary ingredient powder.

In one embodiment, the shell covers part of the outer surface of the core, therefore, parts of the outer surfaces of the cores (i.e., parts of the outer surfaces of the particle of the first primary ingredient powder and/or the second primary ingredient powder) can directly contact each other. In another embodiment, the shell completely covers the outer surface of the core, therefore, the cores (i.e., the particle of the first primary ingredient powder and/or the second primary ingredient powder) are separated by the shell without directly contacting each other.

In the embodiment that the ceramic composition further comprises a third primary ingredient powder and the third primary ingredient powder is $CaZrO_3$, the granules each have a core and a shell, and the shell is located at an outer surface of the core; wherein the core comprises a particle of the first primary ingredient powder, a particle of the second primary ingredient powder or a particle of the third primary ingredient powder, and the shell comprises the rare earth oxide, the silicon oxide and the alkaline-earth metal oxide.

In one embodiment, each of the cores of the granules comprises any of the particle of the first primary ingredient powder, the particle of the second primary ingredient powder and the particle of the third primary ingredient powder, respectively. Preferably, each core comprises one particle of the first primary ingredient powder, one particle of the second primary ingredient powder or one particle of the third primary ingredient powder.

In one embodiment, the shell covers part of the outer surface of the core, therefore, parts of the outer surfaces of the cores (i.e., parts of the outer surfaces of the particle of the first primary ingredient powder, the particle of the second primary ingredient powder and/or the particle of the third primary ingredient powder) can directly contact each other. In another embodiment, the shell completely covers the outer surface of the core, therefore, the cores (i.e., the particle of the first primary ingredient powder, the particle of the second primary ingredient powder and/or the particle of the third primary ingredient powder) are separated by the shell without directly contacting each other.

During the sintering of the ceramic sintered body, part of the powder of the secondary mixture is melted and forms a liquid phase. As the migration of the liquid phase is faster than that of the solid phase, the liquid phase can fill the gaps between the particle of the first primary ingredient powder, the particle of the second primary ingredient powder and/or the particle of the third primary ingredient powder, and covers the cores (i.e., the particle of the first primary ingredient powder, the particle of the second primary ingredient powder and/or the particle of the third primary ingredient powder) respectively, thereby covering all or part of the outer surface of the cores, thereby strengthening the densification of the ceramic sintered body.

The present invention further provides a capacitor, comprising: a dielectric ceramic body, comprising multiple ceramic sintered bodies mentioned above and multiple internal electrodes, and the ceramic sintered bodies and the internal electrodes are stacked up on each other to form the dielectric ceramic body; and two external electrodes, which are respectively disposed on two opposite sides of the dielectric ceramic body and are electrically connected to the internal electrodes.

Preferably, "the ceramic sintered bodies and the internal electrodes are stacked up on each other to form the dielectric ceramic body" means that the ceramic sintered bodies and the internal electrodes are alternately stacked up to form the dielectric ceramic body.

Preferably, the internal electrodes each are approximately perpendicular to the external electrodes, which indicates that an angle of 90 degrees is formed between an internal electrode and an external electrode.

Preferably, both the top layer and the bottom layer of the dielectric ceramic body are the sintered ceramic bodies.

Preferably, the dielectric constant of the capacitor is 1200 or more, such as: 1200 or more, 1500 or more, 2000 or more, 2500 or more, 3000 or more, 3500 or more or 4000 or more.

In one embodiment, the dielectric constant of the capacitor is 1200 to 3500.

Preferably, the capacitor satisfies EIA-X8R specification or EIA-X9R specification.

Preferably, the internal electrode comprises any of nickel, copper or a combination thereof.

Preferably, the external electrode comprises any of copper, nickel, tin or a combination thereof.

The electrode of the present invention can adopt a base metal to reduce the production cost.

Preferably, the capacitor of the present invention is a multilayer ceramic capacitor (MLCC).

More preferably, the capacitor of the present invention can be applicable to the electronization of traditional fuel vehicles, new energy vehicles, autonomous vehicles or the internet of vehicles.

The present invention further provides a method for manufacturing capacitors, comprising: mixing the ceramic composition mentioned above and a first solvent to obtain a ceramic slurry; casting the ceramic slurry to obtain a ceramic foil; disposing an internal electrode on one surface of the ceramic foil to obtain a ceramic foil with the internal electrode; stacking up the ceramic foils with the internal electrode on each other to obtain a laminated ceramic body; sintering the laminated ceramic body to obtain a dielectric ceramic body; wherein the dielectric ceramic body has a laminated structure formed by stacking up multiple ceramic sintered bodies and multiple internal electrodes on each other, wherein the multiple ceramic sintered bodies each are formed by sintering the ceramic foil; and disposing an external electrode on each of two opposite sides of the dielectric ceramic body to obtain the capacitor.

In one embodiment, the "casting the ceramic slurry to obtain a ceramic foil" may be carried out by casting the ceramic slurry on a polyester film to obtain the ceramic foil. Further, the polyester film serves as a carrier and the ceramic foil in the present application does not contain the polyester film.

In one embodiment, the "disposing an internal electrode on one surface of the ceramic foil to obtain a ceramic foil with the internal electrode" may be carried out by printing nickel paste on one surface of the ceramic foil to obtain the ceramic foil with the internal electrode.

In one embodiment, the external electrode may be provided by a dipping method.

Preferably, the first solvent comprises any of water, alcohols, aromatic hydrocarbons, ethers or a combination thereof.

Preferably, "a laminated structure formed by stacking up multiple ceramic sintered bodies and multiple internal electrodes on each other" means a laminated structure with alternately stacked multiple ceramic sintered bodies and multiple internal electrodes.

Preferably, in the step of stacking up the ceramic foils with the internal electrode on each other to obtain a laminated ceramic body, wherein the top layer of the laminated ceramic body is a ceramic foil without an internal electrode.

In one embodiment, the sintering temperature is 1200° C. to 1320° C., the sintering time is 18 minutes to 32 minutes, and the sintering is carried out in a reducing atmosphere.

In one embodiment, the sintering time means soaking time.

In one embodiment, the reducing atmosphere comprises hydrogen and/or nitrogen.

In one embodiment, the internal electrodes comprise any of a nickel electrode, a copper electrode or a combination thereof.

In one embodiment, the external electrodes comprise a copper layer, a nickel layer, a tin layer or a combination thereof. Preferably, the external electrode comprises three layers, which are a copper layer, a nickel layer, and a tin layer, sequentially. More preferably, the external electrodes each comprise three layers, which are a copper layer, a nickel layer, and a tin layer, sequentially.

In one embodiment, the step of mixing the ceramic composition mentioned above and a first solvent to obtain a ceramic slurry may further comprise: adding a second solvent into a powder of the primary mixture to obtain a preliminary primary mixture slurry; drying the preliminary primary mixture slurry by heat to obtain a dried preliminary primary mixture; calcining the dried preliminary primary mixture at a temperature of 900° C. to 1200° C. to obtain a calcined preliminary primary mixture; pulverizing and grinding the calcined preliminary primary mixture to obtain a processed primary mixture powder. The processed primary mixture powder thereby has a better uniformity. The processed primary mixture powder can be used as a primary mixture powder in the present invention.

Preferably, the second solvent comprises any of water, alcohols, aromatic hydrocarbons, ethers or a combination thereof.

To sum up, the capacitor of the present invention satisfies EIA-X8R specification and the dielectric constant thereof increases. Further, the internal electrodes for the capacitor of the present invention can be made of a base metal to reduce production cost. Therefore, the present invention has excellent market potentials.

DETAILED DESCRIPTION OF THE PREFERRED EMBODIMENTS

The present invention is further explained through the following embodiments. A person having ordinary skill in the art can easily understand the advantages and efficacies achieved by the present invention. The present invention should not be limited to the contents of the embodiments. A person having ordinary skill in the art can make some improvement or modifications which are not departing from the spirit and scope of the present invention to practice or apply the content of the present invention.

Preparation 1: Capacitors

The manufacturing methods of all examples in the present invention were the same, as described as follows. A mixture of ethanol and toluene was served as a first solvent for the following use. The first solvent was added into 100 moles of a primary mixture powder to obtain a preliminary mixture. The preliminary mixture was added with a commercial dispersant, and then mixed evenly by a bead mill to obtain a primary mixture slurry. In addition, the first solvent was also added into a secondary mixture powder, and then mixed evenly by a bead mill to obtain a secondary mixture slurry. The primary mixture slurry and the secondary mixture slurry were mixed, added with a commercial organic binder of polyvinyl butyral (PVB) and then mixed evenly by a bead mill to obtain a ceramic slurry. The ceramic slurry was cast on a polyester film (as a carrier, not included in the ceramic foil herein) by a tape casting coater to obtain a ceramic foil with a thickness of 10 microns. An internal electrode of nickel was printed on the surface of the ceramic foil by screen or gravure printing to obtain a ceramic foil with the internal electrode. The ceramic foils with the internal electrode were stacked up on each other to obtain a laminated ceramic body, wherein a ceramic foil which did not comprise any internal electrode was disposed on the top and at the bottom of the laminated ceramic body, thus the ceramic foils were served as the top layer and the bottom layer of the laminated ceramic body. The laminated ceramic body was cut into appropriate size and heated at 250° C. to 350° C. for 12 hours to 36 hours in the nitrogen atmosphere to burn out organic substances, and then sintered in a reducing atmosphere comprising hydrogen and nitrogen for 18 minutes to 32 minutes at a temperature of 1200° C. to 1320° C. to obtain a dielectric ceramic body. The dielectric ceramic body was subjected to a tumbling treatment, and two opposite side surfaces thereof were stained (or dipped) with a copper paste, and then the dielectric ceramic body stained with the copper liquid was heated at 750° C. to 900° C. in an atmosphere of nitrogen to gain a copper electrode layer on each of the two opposite side surfaces, each of the copper electrode layers was further electroplated to form a nickel layer and a tin layer sequentially to form an external electrode, and a capacitor was obtained.

Figure 1:
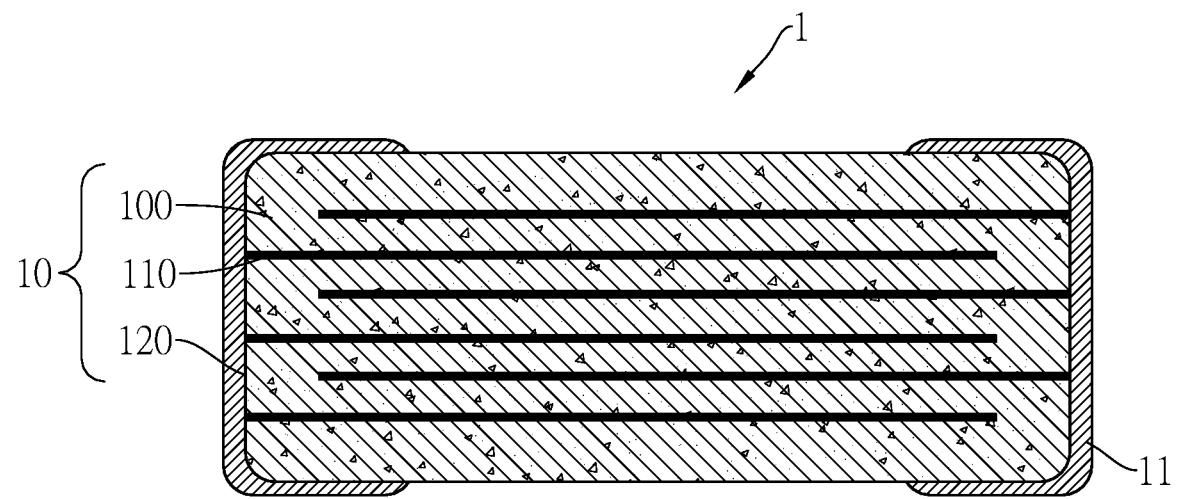
FIG. 1 provides a schematic sectional view of the capacitor of the present invention.

As shown in FIG. 1, a capacitor 1 comprises: a dielectric ceramic body 10, comprising multiple ceramic sintered bodies 100 and multiple internal electrodes 110, and the ceramic sintered bodies 100 and the internal electrodes 110 are stacked up on each other (or alternately stacked up) to form the dielectric ceramic body 10; and two external electrodes 11, which are respectively disposed on opposite side surfaces 120 of the dielectric ceramic body 10 and are electrically connected to the internal electrodes 110.

Figure 2:
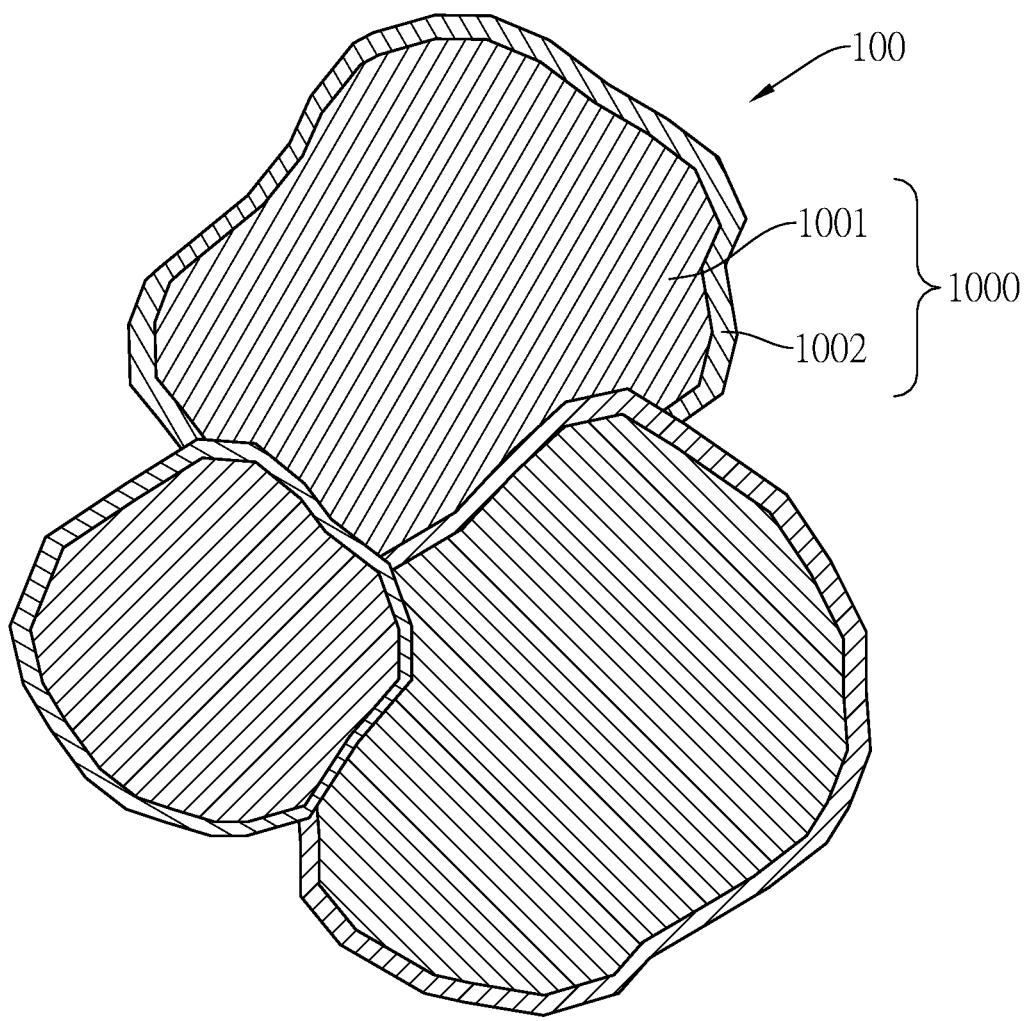
FIG. 2 provides a schematic sectional view of the core and the shell of the ceramic sintered body of the present invention.

As shown in FIG. 2, the ceramic sintered body 100, which is obtained by sintering the ceramic composition, comprises multiple granules 1000 connecting to each other; wherein the granules 1000 each have a core 1001 and a shell 1002, and the shell 1002 is located at an outer surface of the core 1001; wherein the core 1001 comprises a particle of the first primary ingredient powder or a particle of the second primary ingredient powder, and the shell 1002 comprises the rare earth oxide, the silicon oxide and the alkaline-earth metal oxide. Besides, the cores 1001 did not directly contact each other.

Figure 3:
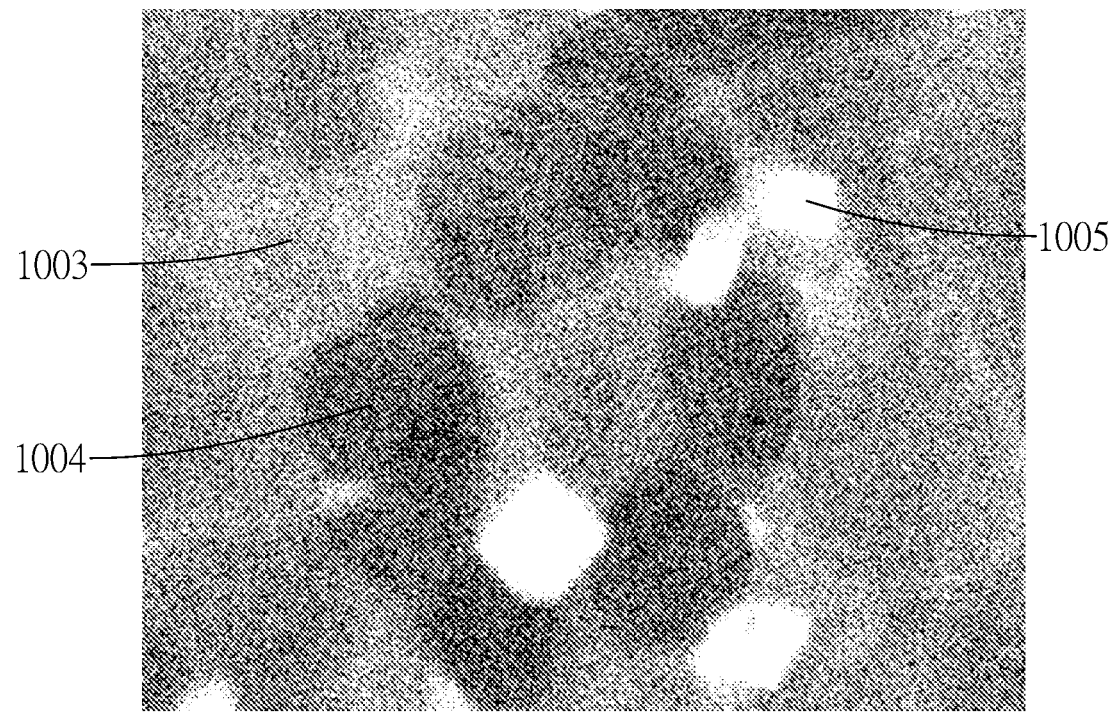
FIG. 3 is an electron microscopy photo showing a sectional view of the ceramic sintered body of the present invention.

FIG. 3 is a microstructure photo of the ceramic sintered body, wherein 1003 is $BaTiO_3$; 1004 is $Ba_{0.95}Ca_{0.05}TiO_3$; and 1005 is $CaZrO_3$.

Test for capacitors: dielectric constant, dissipation factor and temperature coefficient of capacitance A capacitance meter (Model AGILENT4278A) was adopted to measure the capacitance and dissipation factor (DF) of the capacitor under a frequency of 1 KHz and an Alternating Current (AC) voltage of 1 Vrms. The temperature coefficient of capacitance (TCC) represented as $\Delta C/C$ was also measured under the frequency of 1 KHz and the AC voltage of 1 Vrms based on the capacitance change ratio at operating and reference temperature, wherein the reference temperature is 25° C.

The dielectric constant is calculated by the formula: $C = \varepsilon^* \varepsilon_0^* A/d$; wherein C is capacitance (unit: F); $\varepsilon$ is the dielectric constant of the dielectric layer (i.e., K value); $\varepsilon_0$ is vacuum permittivity constant ($8.86 \times 10^{-12}$) (unit: F/m); A is plate area of the capacitor (unit: $m^2$); d is the thickness of the dielectric layer (unit: m). The capacitor of the present invention adopts the imperial system of 0805 specification and the actual size is 2.00 mm×1.25 mm.

Example 1-1 to Example 1-6

The manufacturing methods for Example 1-1 to Example 1-6 were the same as Preparation 1. The ceramic compositions and the test results of the dielectric constant, dissipation factor (DF) and the temperature coefficient of capacitance (TCC) of Example 1-1 to Example 1-6 were shown in Table 1. Further, when a multilayer ceramic capacitor satisfies EIA-X8R specification, the ceramic composition thereof was marked as O.

According to Table 1, based on the total amount of the primary mixture, when the first primary ingredient powder was in an amount of 60 weight percent to 90 weight percent, the second primary ingredient powder was in an amount of 10 weight percent to 40 weight percent; and the primary mixture was in an amount of 100 molar percent, the rare earth oxide was in an amount of 2 molar percent to 4 molar percent, the silicon oxide was in an amount of 0.2 molar percent to 1 molar percent, and the alkaline-earth metal oxide was in an amount of 1 molar percent to 5 molar percent, the capacitors thereof satisfied EIA-X8R specification. Besides, each of the examples had a dielectric constant higher than 2600, and a DF between 2.4 and 6.8%.

Besides, a silicon oxide and an alkaline-earth metal oxide were generally used for adjusting the properties of the laminated ceramic sintered body. Therefore, according to the comparisons among Example 1-2, Example 1-4 and Example 1-6, the addition amounts of the silicon oxide and alkaline-earth metal oxide were not high, and the impacts on the capacitance change thereof were not high, either.

Example 1-1, Example 1-2, and Example 2-1 to Example 2-13

The manufacturing methods for Example 1-1, Example 1-2, and Example 2-1 to Example 2-13 were the same as Preparation 1. The ceramic compositions and the test results of the dielectric constant, dissipation factor (DF) and the temperature coefficient of capacitance (TCC) thereof were shown in Table 2. Further, when a multilayer ceramic capacitor satisfies EIA-X8R specification, the ceramic composition thereof was marked as O.

According to the comparison between Example 1-1 and Example 2-1 in Table 2, and that between Example 1-2 and Example 2-8, when the ceramic composition was further added with a third primary ingredient powder, the dissipation factor of the capacitor reduced by half. Therefore, the addition of the third primary ingredient powder facilitated the improvement of the dissipation factor of the capacitor.

Second, according to the comparisons among Example 2-4 to Example 2-7, increasing the amount of a rare earth oxide can improve the dissipation factor of the capacitor with no or slight impact on the capacitance change.

Finally, according to the comparisons among Example 2-8 to Example 2-10, and Example 2-11 to Example 2-13, when the second primary ingredient powder is $Ba_{0.95}Ca_{0.05}TiO_3$, or the second primary ingredient powder is $BaZr_{0.1}Ti_{0.9}O_3$, increasing the amount of the third primary ingredient powder can reduce the capacitance change as well.

Example 1-2, and Example 3-1 to Example 3-3

The manufacturing methods for Example 1-2 and Example 3-1 to Example 3-3 were the same as Preparation 1; wherein the ceramic compositions of Example 3-1 to Example 3-3 were the same as that of Example 1-2, except the average particle diameters of the first primary ingredient powders thereof were different. The average particle diameters of the first primary ingredient powders and the test results of the capacitor dielectric constant, dissipation factor (DF) and the temperature coefficient of capacitance (TCC) of all examples were shown in Table 3.

According to Table 3, when the average particle diameters of the first primary ingredient powders were 200 nanometers to 500 nanometers, the capacitor can satisfy EIA-X8R specification.

According to Example 1-2, when the average particle diameter of the first primary ingredient powder was 400 nanometers, the multilayer ceramic capacitor had the lowest capacitance change, which was between ±10%.

To sum up, the second primary ingredient powder comprising $SrTiO_3$, $Ba_{0.95}Ca_{0.05}TiO_3$ or $BaZr_{0.1}Ti_{0.9}O_3$ can make the capacitor satisfy EIA-X8R specification. Besides, the addition of $CaZrO_3$ in the ceramic composition can improve the dissipation factor of the capacitor and reduce the capacitance change. Finally, controlling the average particle diameters of the first primary ingredient powder also facilitates the reduction of the capacitance change.

TABLE 1

The ceramic compositions and the test results of the capacitors of Example 1-1 to Example 1-6

| Ingredients | First primary ingredient (wt %) BaTiO$_3$ | Second primary ingredient (wt %) SrTiO$_3$ | Ba$_{0.95}$Ca$_{0.05}$TiO$_3$ | Rare earth oxide (mol %) Y$_2$O$_3$ | Yb$_2$O$_3$ | Silicon oxide (mol %) SiO$_2$ | Alkaline-earth metal oxide (mol %) BaO | MgO | Dielectric constant | DF (%) | TCC (%) −55° C. | 150° C. | EIA-X8R |
|---|---|---|---|---|---|---|---|---|---|---|---|---|---|
| Example 1-1 | 90 | 10 | — | 4 | — | 0.5 | 1 | — | 3028 | 2.4 | −13 | −15 | O |
| Example 1-2 | 70 | — | 30 | — | 2 | 0.5 | — | 1 | 3023 | 5.2 | −8 | −9 | O |
| Example 1-3 | 60 | — | 40 | — | 2 | 0.5 | — | 1 | 2997 | 6.8 | −10 | 2 | O |
| Example 1-4 | 70 | — | 30 | — | 2 | 0.2 | — | 1 | 2669 | 4.9 | −5 | −7 | O |
| Example 1-5 | 70 | — | 30 | — | 2 | 0.8 | — | 1 | 3189 | 5.9 | −11 | −12 | O |
| Example 1-6 | 70 | — | 30 | — | 2 | 1 | — | 5 | 3028 | 6.2 | −15 | −12 | O |

TABLE 2

The ceramic compositions and the test results of the capacitors of Example 1-1, Example 1-2, and Example 2-1 to Example 2-13

| Ingredients | First primary ingredient (wt %) BaTiO$_3$ | Second primary ingredient (wt %) SrTiO$_3$ | Ba$_{0.95}$Ca$_{0.05}$TiO$_3$ | BaZr$_{0.1}$Ti$_{0.9}$O$_3$ | Third primary ingredient (wt %) CaZrO$_3$ | Rare earth oxide (mol %) Y$_2$O$_3$ | Yb$_2$O$_3$ | Dy$_2$O$_3$ | Silicon oxide (mol %) SiO$_2$ | Alkaline-earth metal oxide (mol %) BaO | MgO | CaO | Dielectric constant | DF (%) | TCC (%) −55° C. | 150° C. | EIA-X8R |
|---|---|---|---|---|---|---|---|---|---|---|---|---|---|---|---|---|---|
| Example 1-1 | 90 | 10 | — | — | 0 | 4 | — | 1 | 0.5 | 1 | — | — | 3028 | 2.4 | −13 | −15 | O |
| Example 2-1 | 70 | 20 | — | — | 10 | 4 | — | — | 0.5 | 1 | — | — | 1427 | 1.2 | −5 | −14 | O |
| Example 2-2 | 60 | 20 | — | — | 20 | 4 | — | — | 0.5 | 1 | — | — | 1218 | 1.0 | −3 | −12 | O |
| Example 2-3 | 50 | 20 | — | — | 30 | 4 | — | — | 0.5 | 1 | — | — | 973 | 0.9 | 1 | −4 | O |
| Example 2-4 | 70 | 20 | — | — | 10 | 0.5 | — | — | 0.5 | 1 | — | — | 2133 | 1.7 | 0 | −15 | O |
| Example 2-5 | 70 | 20 | — | — | 10 | 1 | — | — | 0.5 | 1 | — | — | 1572 | 1.4 | −2 | −15 | O |
| Example 2-6 | 70 | 20 | — | — | 10 | 2 | — | — | 0.5 | 1 | — | — | 1216 | 1.2 | −4 | −14 | O |
| Example 2-7 | 70 | 20 | — | — | 10 | 6 | — | — | 0.5 | 1 | — | — | 1194 | 1.0 | −9 | −12 | O |
| Example 1-2 | 70 | — | 30 | — | 0 | — | 2 | — | 0.5 | — | 1 | — | 3023 | 5.2 | −8 | −9 | O |
| Example 2-8 | 70 | — | 20 | — | 10 | — | 2 | — | 0.5 | — | 1 | — | 2618 | 2.6 | −10 | −14 | O |
| Example 2-9 | 60 | — | 20 | — | 20 | — | 2 | — | 0.5 | — | 1 | — | 2371 | 2.1 | −8 | −13 | O |
| Example 2-10 | 50 | — | 20 | — | 30 | — | 2 | — | 0.5 | — | 1 | — | 2003 | 1.7 | −6 | −11 | O |
| Example 2-11 | 70 | — | — | 20 | 10 | — | — | 3 | 0.5 | — | — | 1 | 3452 | 2.9 | −7 | −15 | O |
| Example 2-12 | 60 | — | — | 20 | 20 | — | — | 3 | 0.5 | — | — | 1 | 2817 | 2.5 | −6 | −14 | O |
| Example 2-13 | 50 | — | — | 20 | 30 | — | — | 3 | 0.5 | — | — | 1 | 2204 | 2.4 | −3 | −12 | O |

TABLE 3

The average particle diameters and the test results of the capacitors of Example 1-2, and Example 3-1 to Example 3-3

| | The average particle diameter of the first primary ingredient powder (nanometers) | Dielectric constant | DF(%) | TCC(%) −55° C. | TCC(%) 150° C. | EIA-X8R |
|---|---|---|---|---|---|---|
| Example 3-1 | 500 | 3416 | 5.5 | −5 | −15 | 0 |
| Example 1-2 | 400 | 3023 | 5.2 | −8 | −9 | 0 |
| Example 3-2 | 300 | 2533 | 5.7 | −12 | −1 | 0 |
| Example 3-3 | 200 | 2238 | 4.9 | −14 | 2 | 0 |

What is claimed is:

1. A ceramic composition, comprising a primary mixture and a secondary mixture, wherein
the primary mixture comprises a first primary ingredient powder and a second primary ingredient powder;
the first primary ingredient powder comprises $BaTiO_3$;
the second primary ingredient powder comprises any of $SrTiO_3$, $CaTiO_3$, $BaZrO_3$, $SrZrO_3$, $Ba_xCa_{(1-x)}TiO_3$, $Ca_xSr_{(1-x)}ZrO_3$, $BaZr_yTi_{(1-y)}O_3$, $Ca_xSr_{(1-x)}Zr_yTi_{(1-y)}O_3$ or a combination thereof, wherein x is from 0.91 to 0.99, and y is from 0.05 to 0.2; and
based on the total amount of the primary mixture, the first primary ingredient powder is in an amount of 55 weight percent to 95 weight percent, and the second primary ingredient powder is in an amount of 5 weight percent to 45 weight percent; and
the secondary mixture comprises a rare earth oxide, a silicon oxide and an alkaline-earth metal oxide.

2. The ceramic composition as claimed in claim 1, wherein based on the primary mixture in an amount of 100 molar percent, the secondary mixture is in an amount of 1.1 molar percent to 13.5 molar percent.

3. The ceramic composition as claimed in claim 1, wherein based on the primary mixture in an amount of 100 molar percent, the rare earth oxide, the silicon oxide and the alkaline-earth metal oxide are in an amount of 0.3 molar percent to 8 molar percent: 0.01 molar percent to 1.5 molar percent: 0.1 molar percent to 5.5 molar percent.

4. The ceramic composition as claimed in claim 1, wherein the average particle diameter of the first primary ingredient powder is 150 nanometers to 600 nanometers.

5. The ceramic composition as claimed in claim 1, wherein the first primary ingredient powder is prepared by solid state reaction, oxalate coprecipitation or hydrothermal method.

6. The ceramic composition as claimed in claim 1, wherein the second primary ingredient powder comprises any of $SrTiO_3$, $Ba_{0.95}Ca_{0.05}TiO_3$, $BaZr_{0.1}Ti_{0.9}O_3$ or a combination thereof.

7. The ceramic composition as claimed in claim 1, wherein the primary mixture further comprises a third primary ingredient powder, and the third primary ingredient powder is $CaZrO_3$.

8. The ceramic composition as claimed in claim 7, wherein based on the total amount of the primary mixture, the first primary ingredient powder is in an amount of 45 weight percent to 75 weight percent, the second primary ingredient powder is in an amount of 15 weight percent to 25 weight percent, and the third primary ingredient powder is in an amount of 5 weight percent to 35 weight percent.

9. A ceramic sintered body, obtained by sintering the ceramic composition as claimed in claim 1, and comprising multiple granules connecting to each other; wherein the granules each have a core and a shell, and the shell is located at an outer surface of the core; wherein the core comprises a particle of the first primary ingredient powder or a particle of the second primary ingredient powder; and the shell comprises the rare earth oxide, the silicon oxide and the alkaline-earth metal oxide.

10. A ceramic sintered body, obtained by sintering the ceramic composition as claimed in claim 7, and comprising multiple granules connecting to each other; wherein the granules each have a core and a shell, and the shell is located at an outer surface of the core; wherein the core comprises a particle of the first primary ingredient powder, a particle of the second primary ingredient powder or a particle of the third primary ingredient powder; and the shell comprises the rare earth oxide, the silicon oxide and the alkaline-earth metal oxide.

11. A capacitor, comprising:
a dielectric ceramic body, comprising multiple ceramic sintered bodies as claimed in claim 9 and multiple internal electrodes, and the ceramic sintered bodies and the internal electrodes are stacked up on each other to form the dielectric ceramic body; and
two external electrodes, which are respectively disposed on two opposite sides of the dielectric ceramic body and are electrically connected to the internal electrodes.

12. The capacitor as claimed in claim 11, wherein the dielectric constant of the capacitor is 1200 or more.

13. The capacitor as claimed in claim 11, which satisfies EIA-X8R specification or EIA-X9R specification, wherein EIA-X8R specification requires a capacitance variation of ±15% between −55° C. and +150° C., and EIA-X9R specification requires a capacitance variation of ±15% between −55° C. and +200° C.

14. The capacitor as claimed in claim 12, which satisfies EIA-X8R specification or EIA-X9R specification, wherein EIA-X8R specification requires a capacitance variation of ±15% between −55° C. and +150° C., and EIA-X9R specification requires a capacitance variation of ±15% between −55° C. and +200° C.

15. A capacitor, comprising:
a dielectric ceramic body, comprising multiple ceramic sintered bodies as claimed in claim 10 and multiple internal electrodes, and the ceramic sintered bodies and the internal electrodes are stacked up on each other to form the dielectric ceramic body; and
two external electrodes, which are respectively disposed on two opposite sides of the dielectric ceramic body and are electrically connected to the internal electrodes.

16. The capacitor as claimed in claim 15, wherein the dielectric constant of the capacitor is 1200 or more.

17. The capacitor as claimed in claim 15, which satisfies EIA-X8R specification or EIA-X9R specification, wherein EIA-X8R specification requires a capacitance variation of ±15% between −55° C. and +150° C., and EIA-X9R specification requires a capacitance variation of ±15% between −55° C. and +200° C.

18. The capacitor as claimed in claim 16, which satisfies EIA-X8R specification or EIA-X9R specification, wherein EIA-X8R specification requires a capacitance variation of ±15% between −55° C. and +150° C., and EIA-X9R specification requires a capacitance variation of ±15% between −55° C. and +200° C.

19. A method for manufacturing capacitors, comprising:
mixing the ceramic composition as claimed in claim 1 and a first solvent to obtain a ceramic slurry; casting the ceramic slurry to obtain a ceramic foil;
disposing an internal electrode on one surface of the ceramic foil to obtain a ceramic foil with the internal electrode; stacking up multiple said ceramic foils with the internal electrode on each other to obtain a laminated ceramic body; sintering the laminated ceramic body to obtain a dielectric ceramic body, wherein the dielectric ceramic body has a laminated structure formed by stacking up multiple ceramic sintered bodies and multiple internal electrodes on each other, wherein the multiple ceramic sintered bodies each are formed by sintering the ceramic foil; and disposing an external electrode on each of two opposite sides of the dielectric ceramic body to obtain the capacitor.

* * * * *